US012627783B2

(12) United States Patent
Varekamp et al.

(10) Patent No.: US 12,627,783 B2
(45) Date of Patent: May 12, 2026

(54) GENERATION OF IMAGES FOR THREE-DIMENSIONAL VIDEO FOR DIFFERENT VIEWPOINTS

(71) Applicant: KONINKLIJKE PHILIPS N.V., Eindhoven (NL)

(72) Inventors: Christiaan Varekamp, Veldhoven (NL); Bartholomeus Wilhelmus Damianus Van Geest, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 80 days.

(21) Appl. No.: 18/572,840

(22) PCT Filed: Jun. 24, 2022

(86) PCT No.: PCT/EP2022/067371
§ 371 (c)(1),
(2) Date: Dec. 21, 2023

(87) PCT Pub. No.: WO2023/274879
PCT Pub. Date: Jan. 5, 2023

(65) Prior Publication Data
US 2024/0323330 A1      Sep. 26, 2024

(30) Foreign Application Priority Data
Jun. 29, 2021      (EP) ..................................... 21182528

(51) Int. Cl.
*H04N 13/117*          (2018.01)
*G06T 15/20*          (2011.01)
(Continued)

(52) U.S. Cl.
CPC ......... *H04N 13/117* (2018.05); *G06T 15/205* (2013.01); *G06T 17/205* (2013.01);
(Continued)

(58) Field of Classification Search
CPC .. H04N 13/117; H04N 13/268; H04N 13/128; H04N 21/6587; G06T 15/205; G06T 17/205
See application file for complete search history.

(56) References Cited

U.S. PATENT DOCUMENTS

| | | | |
|---|---|---|---|
| 11,218,690 B2 | 1/2022 | Kroon et al. | |
| 2005/0018045 A1* | 1/2005 | Thomas ............... | G06V 10/147 348/E5.022 |

(Continued)

FOREIGN PATENT DOCUMENTS

| | | |
|---|---|---|
| EP | 3422711 A1 | 1/2019 |
| WO | 2022157052 A1 | 7/2022 |

OTHER PUBLICATIONS

Shum et al "Review of Image-Based Rendering Techniques" Spie Smart Structures and Materials . . . vol. 4067 May 30, 2000 p. 1-12.
(Continued)

*Primary Examiner* — Terrell M Robinson

(57) ABSTRACT
An apparatus comprises a receiver (601) receiving captured video data for a real world scene and being linked with a capture pose region. A store (615) stores a 3D mesh model of the real world scene. A renderer (605) generates an output image for a viewport for a viewing pose. The renderer (605) comprises a first circuit (607) arranged to generate first image data for the output image by projection of captured video data to the viewing pose and second circuit (609) arranged to determine second image data for a first region of the output image in response to the three-dimensional mesh model. A third circuit (611) generates the output image to include at least some of the first image data and to include the second image data for the first region. A fourth circuit (613) determines the first region based on a deviation of the viewing pose relative to the capture pose region.

20 Claims, 9 Drawing Sheets

(51) Int. Cl.

| | |
|---|---|
| *G06T 17/20* | (2006.01) |
| *H04N 13/128* | (2018.01) |
| *H04N 13/243* | (2018.01) |
| *H04N 13/268* | (2018.01) |
| *H04N 13/271* | (2018.01) |
| *H04N 13/383* | (2018.01) |
| *H04N 21/218* | (2011.01) |
| *H04N 21/6587* | (2011.01) |
| *H04N 21/81* | (2011.01) |

(52) U.S. Cl.
CPC ......... *H04N 13/128* (2018.05); *H04N 13/243* (2018.05); *H04N 13/268* (2018.05); *H04N 13/271* (2018.05); *H04N 13/383* (2018.05); *H04N 21/21805* (2013.01); *H04N 21/6587* (2013.01); *H04N 21/816* (2013.01)

(56) References Cited

U.S. PATENT DOCUMENTS

| | | | | |
|---|---|---|---|---|
| 2007/0109300 | A1* | 5/2007 | Li | G06T 15/20 |
| | | | | 345/419 |
| 2010/0231689 | A1* | 9/2010 | Bruls | H04N 13/128 |
| | | | | 348/E13.001 |
| 2012/0013711 | A1* | 1/2012 | Tamir | H04N 13/261 |
| | | | | 348/46 |
| 2018/0310025 | A1* | 10/2018 | Keränen | G06T 17/005 |
| 2019/0058905 | A1 | 2/2019 | Elliott et al. | |
| 2019/0295308 | A1 | 9/2019 | Sheeler et al. | |
| 2020/0092591 | A1 | 3/2020 | Sabatier et al. | |
| 2021/0092371 | A1 | 3/2021 | Han et al. | |
| 2021/0127057 | A1* | 4/2021 | Varekamp | H04N 23/64 |
| 2022/0383596 | A1 | 12/2022 | Varekamp et al. | |

OTHER PUBLICATIONS

International Search Report and Written Opinion from PCT/EP2022/067371 mailed Oct. 11, 2022.

ISO/IEC JTC1 SC29/WG11 "Coding of Motion Pictures and Audio" Jul. 3, 2020.

Toshev et al "Deep Pose: Human Pose Estimation via Deep Neural Networks" 2014 IEEE Conference on Computer Vision and Pattern Recognition, Columbus, OH, USA, 2014, pp. 1653-1660, doi: 10.1109/CVPR.2014.214.

P. Isola et.al. 2017. Image-to-Image Translation with Conditional Adversarial Networks. CVPR 2017. [https://arxiv.org/abs/1611.07004].

https://en.wikipedia.org/wiki/Object_detection—downloaded Nov. 13, 2023.

\* cited by examiner

GENERATION OF IMAGES FOR THREE-DIMENSIONAL VIDEO FOR DIFFERENT VIEWPOINTS

CROSS-REFERENCE TO PRIOR APPLICATIONS

This application is the U.S. National Phase application under 35 U.S.C. § 371 of International Application No. PCT/EP2022/067371, filed on Jun. 24, 2022, which claims the benefit of EP Patent Application No. EP 21182528.6, filed on Jun. 29, 2021. These applications are hereby incorporated by reference herein.

FIELD OF THE INVENTION

The invention relates to an image generation approach and in particular, but not exclusively, to generation of images for a three dimensional video signal for different viewpoints.

BACKGROUND OF THE INVENTION

The variety and range of image and video applications have increased substantially in recent years with new services and ways of utilizing and consuming video and images being continuously developed and introduced.

For example, one service being increasingly popular is the provision of image sequences in such a way that the viewer is able to actively and dynamically interact with the view of the scene such the viewer can change the viewing position or direction in the scene with the presented video adapting to present a view from the changed position or direction.

Three dimensional video capture, distribution, and presentation is becoming increasingly popular and desirable in some applications and services. A particular approach is known as immersive video and typically includes the provision of views of a real-world scene, and often a real time event, that allow small viewer movements, such as relatively small head movements and rotations. For example, real-time video broadcast of e.g. a sports event that allows local client based generation of views following small head movements of a viewer may provide the impression of a user being seated in the stands watching the sports event. The user can e.g. look around and will have a natural experience similar to the experience of a spectator being present at that position in the stand. Recently, there has been an increasing prevalence of display devices with positional tracking and 3D interaction supporting applications based on 3D capturing of real-world scenes. Such display devices are highly suitable for immersive video applications providing an enhanced three dimensional user experience.

In order to provide such services for a real-world scene, the scene is typically captured from different positions and with different camera capture poses being used. As a result, the relevance and importance of multi-camera capturing and e.g. 6DoF (6 Degrees of Freedom) processing is quickly increasing. Applications include live concerts, live sports, and telepresence. The freedom of selecting one's own viewpoint enriches these applications by increasing the feeling of presence over regular video. Furthermore, immersive scenarios can be conceived where an observer may navigate and interact with a live captured scene. For broadcast applications this may require real-time depth estimation on the production side and real-time view synthesis at the client device. Both depth estimation and view synthesis introduce errors and these errors depend on the implementation details of the algorithms employed. In many such applications, three dimensional scene information is often provided that allows high quality view image synthesis for viewpoints that are relatively close to the reference viewpoint(s) but which deteriorates if the viewpoint deviates too much from the reference viewpoints.

A set of video cameras that are offset with respect to each other may capture a scene in order to provide three dimensional image data, for example in the form of multiple 2D images from offset positions and/or as image data plus depth data. A rendering device may dynamically process the three dimensional data to generate images for different view positions/directions as these change. The rendering device can dynamically perform e.g. view point shifting or projection to dynamically follow the user movements.

An issue with e.g. immersive video is that the viewing-space, being a space wherein a viewer has an experience of sufficient quality, is limited. As the viewer moves outside the viewing space, degradations and errors resulting from synthesizing the view images become increasingly significant and an unacceptable user experience may result. Errors, artefacts, and inaccuracies in the generated view images may specifically occur due to the provided 3D video data not providing sufficient information for the view synthesis (e.g. de-occlusion data).

For example, typically when multiple cameras are used to capture a 3D representation of a scene, playback on a virtual reality headset tends to be spatially limited to virtual viewpoints that lie close to the original camera locations. This ensures that the render quality of the virtual viewpoints does not show artefacts, typically the result of missing information (occluded data) or 3D estimation errors.

Inside the so-called sweet spot viewing zone, rendering can be done directly from one or multiple reference camera images with associated depth map or mesh using standard texture mapping in combination with view blending.

Outside the sweet spot viewing zone, the image quality is reduced and often to an unacceptable extent. In current applications, this may be addressed by the viewer being presented with a blurred picture or even a black picture for the parts of the scene that cannot be rendered sufficiently accurately. However, such approaches tend to be suboptimal and tend to provide a suboptimal user experience. EP 3 422 711A1 discloses an example of a rendering system where blurring is introduced to bias a user away from parts of a scene not represented by an incomplete representation of the scene.

Hence, an improved approach would be advantageous. In particular, an approach that allows improved operation, increased flexibility, an improved immersive user experience, reduced complexity, facilitated implementation, increased perceived synthesized image quality, improved rendering, increased (possibly virtual) movement freedom for a user, an improved user experience and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus comprising: a first receiver arranged to receive captured video data for a real world scene, the video data being linked with a capture pose region: a store arranged to store a three-dimensional mesh model of at least part of the real world scene: a second receiver arranged to receive a viewing pose: a renderer arranged to generate an output image for a viewport for the viewing pose: wherein the renderer comprises: a first circuit arranged to generate first image data for the viewport for at least part of the output image by projection of captured video data to the viewing pose: a second circuit arranged to generate second image data for the output viewport for at least a first region of the output image from the three-dimensional mesh model: a third circuit arranged to generate the output image to include at least some of the first image data and to include the second image data for the first region; and a fourth circuit arranged to determine the first region in dependence on a deviation of the viewing pose relative to the capture pose region.

The invention may provide an improved user experience in many embodiments and scenarios. It may allow improved trade-offs between image quality and freedom of movement for many applications. The approach may in many cases provide a more immersive user experience and may be highly suitable for immersive video applications. The approach may reduce a perceived quality degradation for different viewing poses. The approach may for example provide a user with an improved experience for a larger range of changes in position and/or orientation. In many embodiments, the approach may provide reduced requirements for the capture of the real world scene. For example, fewer cameras may be used. The requirement for how much of the scene is captured may be reduced. The approach may in many embodiments reduce data communication requirements and may for example allow lower lag interactive services.

The approach may for example allow an improved immersive video experience.

A pose may be a position and/or orientation. A pose region may be a contiguous set of poses. The capture pose region may be a region for which the captured video data provides data allowing image data having a quality meeting a quality criterion to be generated. The output image may be an image of an image sequence and may specifically be a frame/image of a video sequence.

The three dimensional mesh model may further comprise at least one pixel map having pixel values linked to vertices of a three dimensional mesh of the three dimensional mesh model.

In accordance with an optional feature of the invention, the renderer is arranged to; determine the first region as a region for which a quality of first image data generated by the first circuit does not meet a quality criterion.

In some embodiments, the renderer is arranged to: determine an intermediate image comprising the first image data: determine the first region as a region for which a quality of image data of the intermediate image does not meet a quality criterion.

This may provide improved and/or facilitated operation in many embodiments. It may provide a particularly efficient approach for determining the first region which may be particularly suitable for providing an attractive user experience.

In accordance with an optional feature of the invention, the third circuit is arranged to determine the first region in dependence on a difference between the viewing pose and the capture pose region.

This may provide improved and/or facilitated operation in many embodiments. I may provide a particularly efficient approach for determining the first region which may be particularly suitable for providing an attractive user experience.

In many embodiments, the third circuit may be arranged to determine the first region in dependence on a distance between the viewing pose and the capture pose region. The distance may be determined in accordance with a suitable distance measure. The distance measure may reflect a distance in position and/or orientation of the viewing pose relative to the capture pose region.

In accordance with an optional feature of the invention, the difference is an angular difference.

This may provide improved and/or facilitated operation in many embodiments.

In accordance with an optional feature of the invention, the renderer is arranged to adapt the second image data in dependence on the captured video data.

This may provide an improved user experience in many embodiments. It may in many scenarios provide a more consistent and coherent output image to be generated, and may reduce the perceived visibility of a difference between parts of the output image generated from video data and parts of the output image generated from the three dimensional mesh model.

In accordance with an optional feature of the invention, the renderer is arranged to adapt the first data in dependence on the three-dimensional mesh model.

This may provide an improved user experience in many embodiments. It may in many scenarios provide a more consistent and coherent output image to be generated, and may reduce the perceived visibility of a difference between parts of the output image generated from video data and parts of the output image generated from the three dimensional mesh model.

In accordance with an optional feature of the invention, the renderer is arranged to adapt the second image data in dependence on the first image data.

This may provide an improved user experience in many embodiments. It may in many scenarios provide a more consistent and coherent output image to be generated, and may reduce the perceived visibility of a difference between parts of the output image generated from video data and parts of the output image generated from the three dimensional mesh model.

In accordance with an optional feature of the invention, the renderer is arranged to adapt the first image data in dependence on the second image data.

This may provide an improved user experience in many embodiments. It may in many scenarios provide a more consistent and coherent output image to be generated, and may reduce the perceived visibility of a difference between parts of the output image generated from video data and parts of the output image generated from the three dimensional mesh model.

In accordance with an optional feature of the invention, the renderer is arranged to adapt the three dimensional mesh model in dependence on the first image data.

This may provide an improved user experience in many embodiments. It may in many scenarios provide a more consistent and coherent output image to be generated, and may reduce the perceived visibility of a difference between parts of the output image generated from video data and parts of the output image generated from the three dimensional mesh model.

In accordance with an optional feature of the invention, the apparatus further comprises a model generator for generating the three dimensional mesh model in dependence on the captured video data.

This may provide improved operation and/facilitated implementation in many embodiments.

In accordance with an optional feature of the invention, the first receiver is arranged to receive the video data from a remote source; and to further receive the three dimensional mesh model from the remote source.

This may provide improved operation and/facilitated implementation in many embodiments.

In accordance with an optional feature of the invention, the second circuit is arranged to vary a detail level for the first region in dependence on the deviation of the viewing pose relative to the capture zone.

This may provide a further improved user experience in many embodiments and may provide an improved perceptual adaptation to the viewer pose changes.

In accordance with an optional feature of the invention, the first receiver is further arranged to receive second captured video data for the real world scene, the second captured video data being linked with a second capture pose region; and wherein the first circuit is further arranged to determine third image data for at least part of the output image by projection of the second captured video data to the viewing pose; and the third circuit is arranged to determine the first region in dependence on a deviation of the viewing pose with respect to the second capture pose region.

This may provide an enhanced user experience in many scenarios and embodiments.

In accordance with an aspect of the invention, method comprising:

receiving captured video data for a real world scene, the video data being linked with a capture pose region: storing a three-dimensional mesh model of at least part of the real world scene; receiving a viewing pose: generating an output image for a viewport for the viewing pose: wherein generating the output image comprises: generating first image data for the viewport for at least part of the output image by projection of captured video data to the viewing pose: generating second image data for the output viewport for at least a first region of the output image from the three-dimensional mesh model; generating the output image to include at least some of the first image data and to include the second image data for the first region; and determining the first region in dependence on a deviation of the viewing pose relative to the capture pose region.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description will focus on an immersive video application, but it will be appreciated that the described principles and concepts may be used in many other applications and embodiments.

In many approaches, the immersive video may be provided locally to a viewer by e.g. a stand-alone device that does not use, or even have any access to, any remote video server. However, in other applications, an immersive application may be based on data received from a remote or central server. For example, video data may be provided to a video rendering device from a remote central server and may be locally processed to generate a desired immersive video experience.

Figure 1:
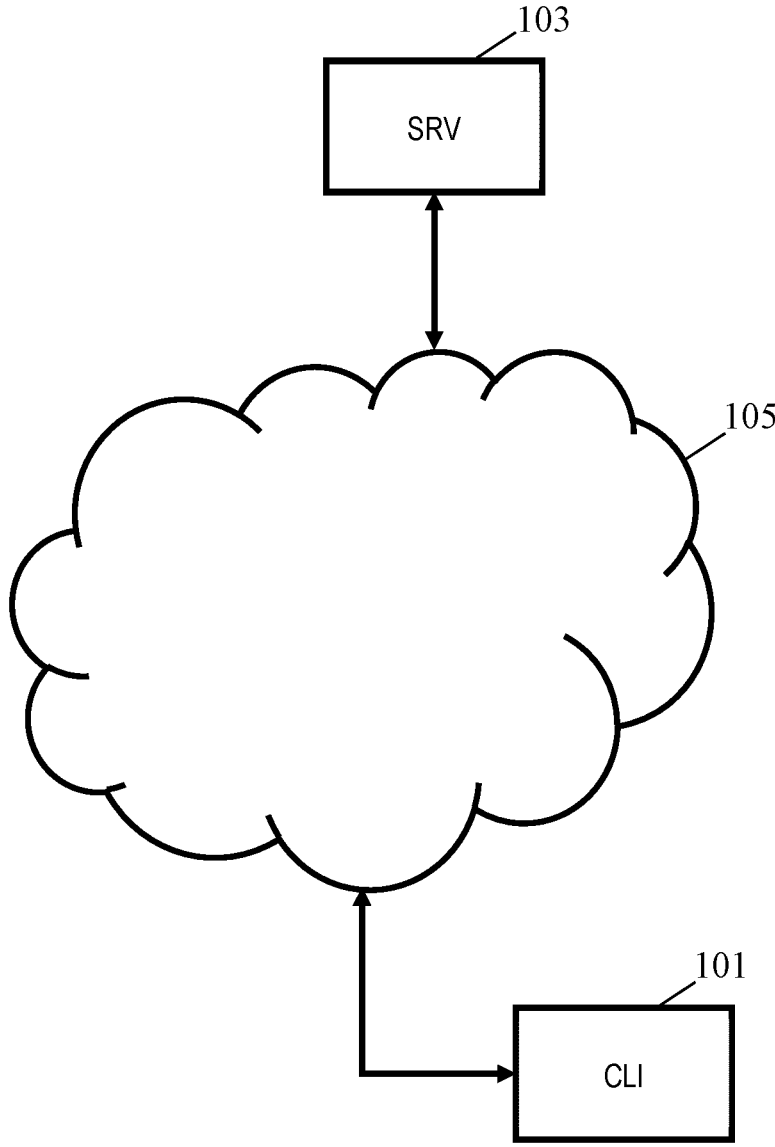
FIG. 1 illustrates an example of elements of a video distribution system in accordance with some embodiments of the invention.

FIG. 1 illustrates such an example of an immersive video system in which a video rendering device 101 liaises with a remove immersive video server 103 e.g. via a network 105, such as the Internet. The server 103 may be arranged to simultaneously support a potentially large number of client video rendering devices 101.

The immersive video server 103 may for example support an immersive video experience by transmitting three dimensional video data describing a real world scene. The data may specifically describe visual features and geometric properties of the scene which is generated from a real time capture of the real world by a set of (possibly 3D) cameras.

Figure 2:
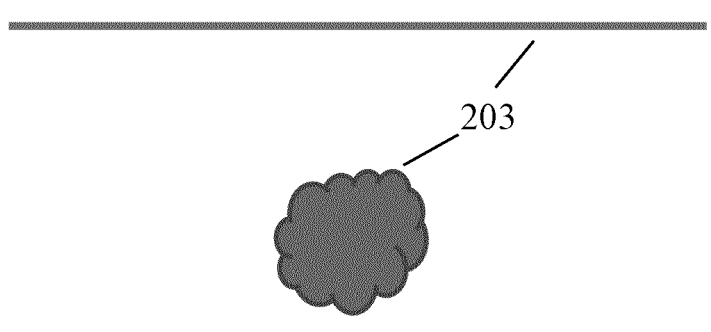
FIG. 2 illustrates an example of a capture of a 3D scene.
Figure 2:
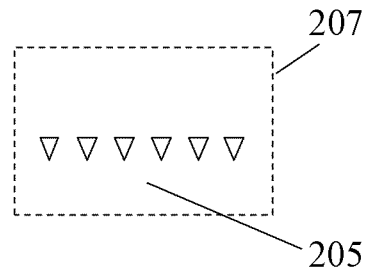

For example, as illustrated in FIG. 2, a set of cameras may be arranged individually offset in a suitable capture configuration (e.g. in a line) and may each capture an image of the scene 203. The captured data may be used to generate a 3D video data stream which may be transmitted from the immersive video server 103 to remote video rendering devices.

The 3D video data may e.g. be a video stream and may for example directly include the captured images from multiple cameras and/or may e.g. include processed data such as image plus depth data generated from the captured images. It will be appreciated that many techniques and approaches for generating 3D video data is known and that any suitable approach and 3D video data format/representation may be used without detracting from the invention.

The immersive video rendering device 101 is arranged to receive and process the received 3D video data to generate an output video stream that dynamically reflects changes in the user pose thereby providing an immersive video experience where the presented view adapts to viewing/user pose/placement changes.

In the field, the terms placement and pose are used as a common term for position and/or direction/orientation. The combination of the position and direction/orientation of e.g., an object, a camera, a head, or a view may be referred to as a pose or placement. Thus, a placement or pose indication may comprise six values/components/degrees of freedom with each value/component typically describing an individual property of the position/location or the orientation/direction of the corresponding object. Of course, in many situations, a placement or pose may be considered or represented with fewer components, for example if one or more components is considered fixed or irrelevant (e.g. if all objects are considered to be at the same height and have a horizontal orientation, four components may provide a full representation of the pose of an object). In the following, the term pose is used to refer to a position and/or orientation which may be represented by one to six values (corresponding to the maximum possible degrees of freedom). The term pose may be replaced by the term placement. The term pose may be replaced by the term position and/or orientation. The term pose may be replaced by the term position and orientation (if the pose provides information of both position and orientation), by the term position (if the pose provides information of (possibly only) position, or by orientation (if the pose provides information of (possibly only) orientation.

The quality of the generated view images will depend on the images and depth information that is available to the view synthesis operation. It further depends on the amount of reprojection and view shifting that is required.

For example, view shifting typically results in de-occlusion of parts of the image that may not be visible in e.g. a main image being used for the view shifting. Such holes may be filled in by data from other images if these have captured the de-occluded objects, but it is also typically possible that image parts which are de-occluded for the new viewpoint are also missing from the other source views. In that case, the view synthesis needs to estimate data based on e.g. surrounding data. The de-occlusion process inherently tends to be a process that introduces inaccuracies, artefacts, and errors. Further, this tends to increase with the amount of the view shift and specifically the likelihood of missing data (holes) during view-synthesis increases with increasing distance from the capture poses of the images.

Another source of possible distortions may be imperfect depth information. Often depth information is provided by depth maps where the depth values have been generated by depth estimation (e.g. by disparity estimation between the source images) or measurement (e.g. ranging) which is not perfect and therefore the depth values may include errors and inaccuracies. The view shifting is based on the depth information and imperfect depth information leads to errors or inaccuracies in the synthesized image(s). The further from the original camera viewpoint, the synthesized viewpoint is, the more severe are the distortions in the synthesized target view image.

Accordingly, as the viewing pose moves farther and farther from the capture poses, the quality of the synthesized image will tend to degrade. If the viewing pose is sufficiently far away from the capture poses, the image quality reduces to an unacceptable degree and a poor user experience may be experienced.

Figure 3:
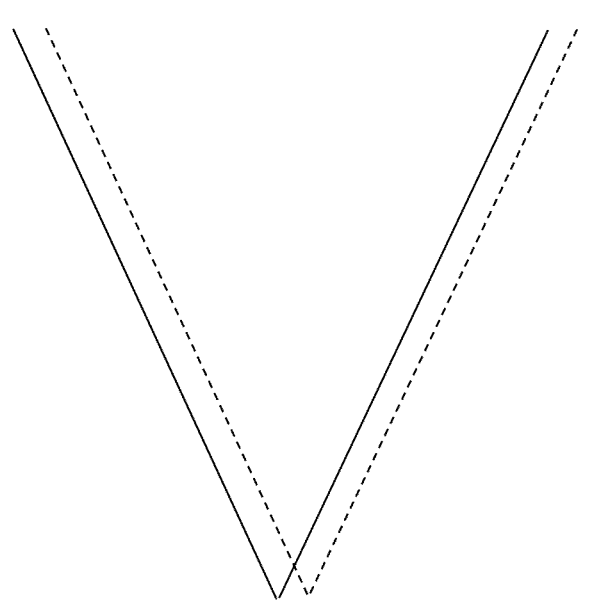
FIG. 3 illustrates an example of a view that may be generated for a specific viewing pose.
Figure 3:
Figure 4:
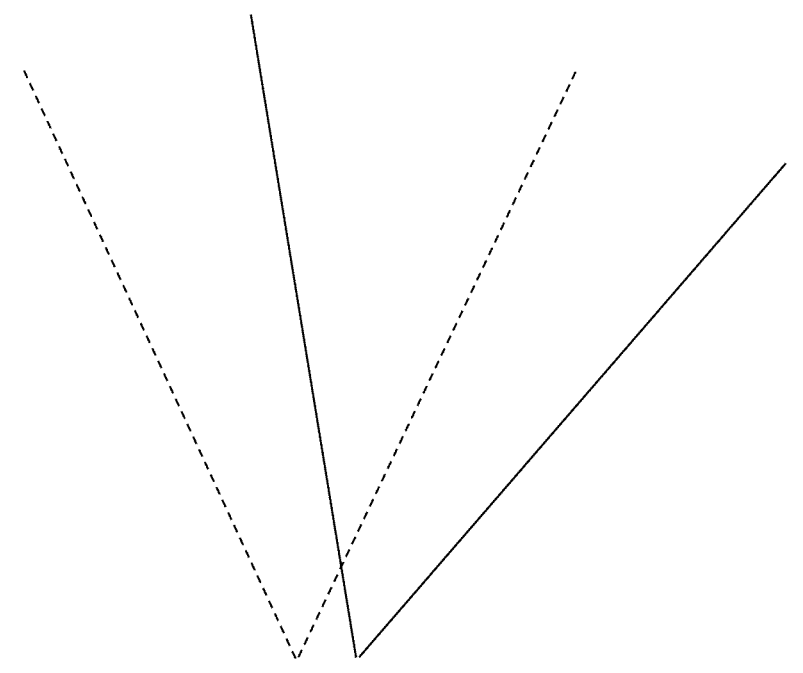
FIG. 4 illustrates an example of a view that may be generated for a specific viewing pose.
Figure 4:
Figure 5:
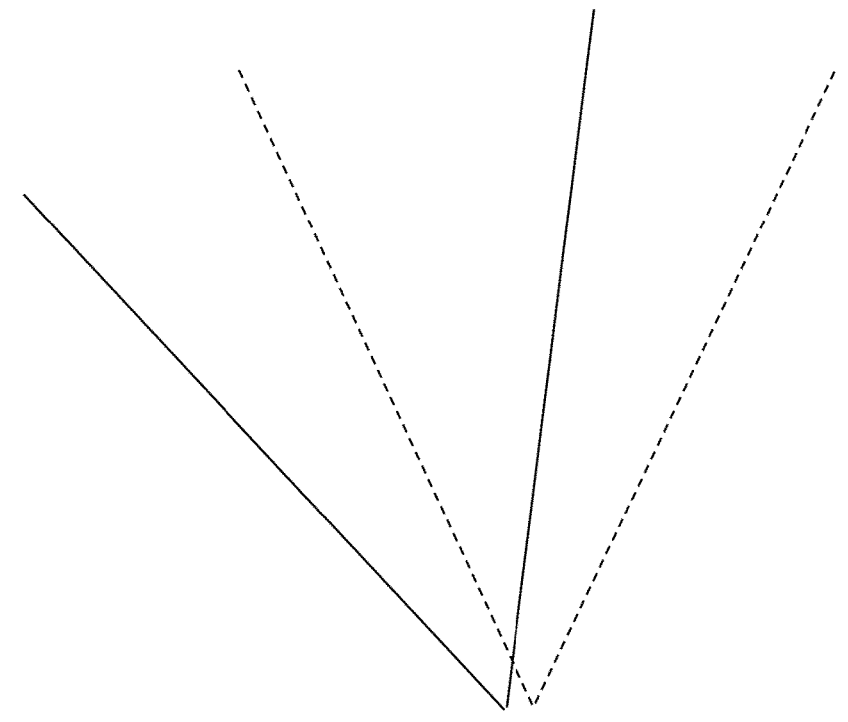
FIG. 5 illustrates an example of a view that may be generated for a specific viewing pose.
Figure 5:

FIGS. 3-5 illustrate the issue associated with moving away from the capture poses. FIG. 3 illustrates an example where the synthesized viewport aligns closely with the viewports of the capture cameras and the specific image for the viewing pose viewport can hence be predicted from capture cameras using depth image based rendering with a resulting high quality image. In contrast, in the examples of FIGS. 4 and 5, the viewing pose differs from the capture poses by the angular direction of the viewport differing from the capture viewports. As illustrated, the change in angular viewing direction results in no suitable image data being provided for large parts of the image (in the example on the right or left side of the image). Further, extrapolating information from the image data into the unknown areas may provide some improved perception but as illustrated may result in a very substantial degradation and distortion, and leads to an unrealistic representation of the scene.

The viewing pose may differ from the capture poses by deviations in the position and/or the angle of view and the effect of these may differ. A change of position, such as a translation, may tend to increase de-occlusion areas behind foreground objects and may increase the unreliability of the view synthesis due to the 3D (depth/geometry) estimation uncertainty. An angular change of view point to rotate away from the capture camera angles may result in e.g. no image data being available for large areas of the new viewports (as illustrated by FIGS. 4 and 5).

The above issues may result in a poor immersive effect since the full field of view of the display (e.g. often typically 110 degree) is filled and head-rotation does not introduce new content. Also, the spatial context is often lost, and it may be more difficult to navigate when the image is blurred or otherwise of low quality. A number of different approaches to address these issues have been suggested but these tend to be suboptimal and specifically to either restrict the user movement undesirably or to introduce undesirable user effects.

Figure 6:
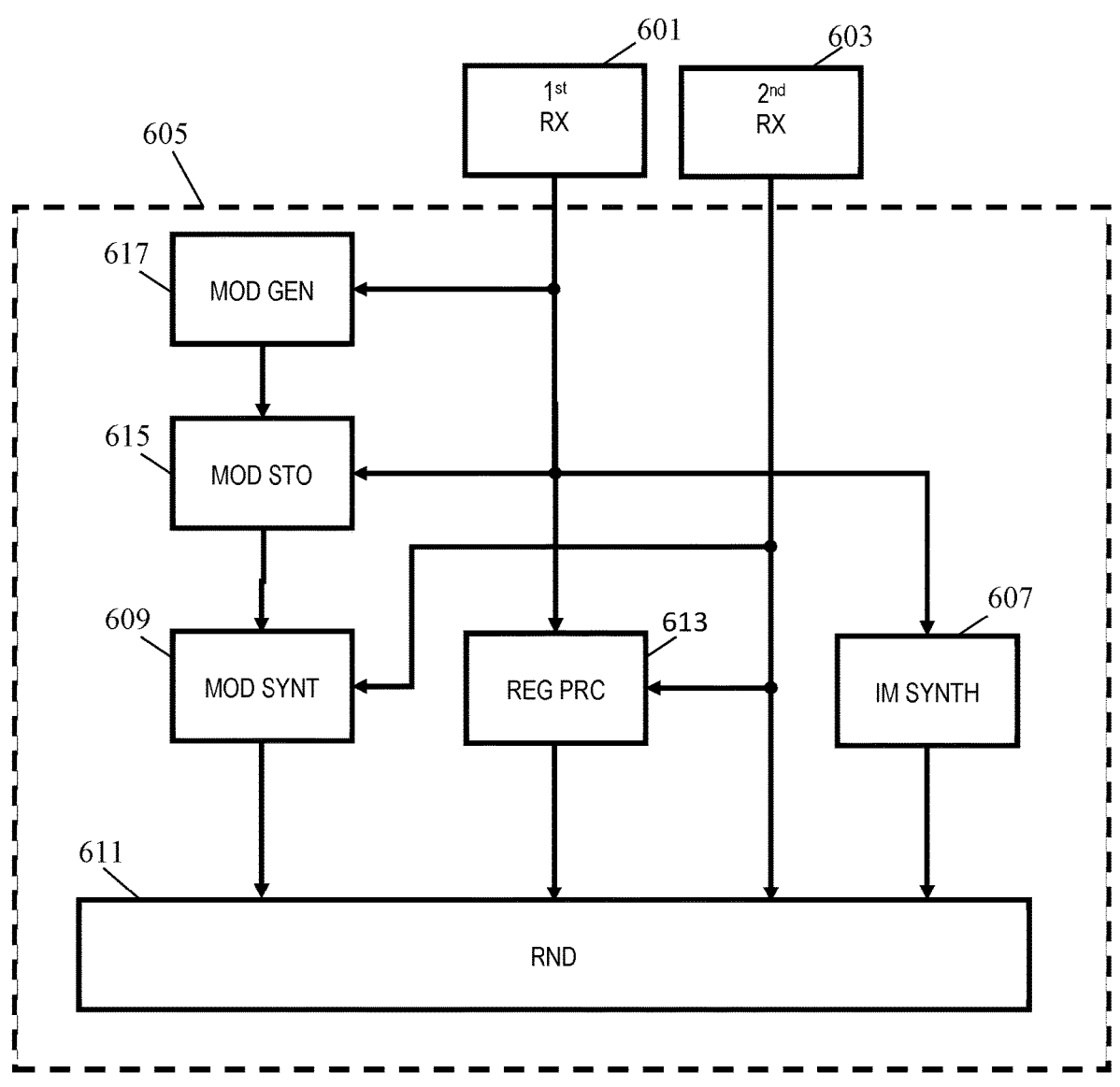
FIG. 6 illustrates an example of elements of a video rendering device in accordance with some embodiments of the invention.

FIG. 6 illustrates a video rendering apparatus/system/device that may provide a performance and approach which can achieve a more desirable user experience in many scenarios. The apparatus may specifically be the video rendering device 101 of FIG. 1.

The video rendering device comprises a first receiver 601 arranged to receive captured video data for a real world scene. In the example, the video data is provided by the video server 103.

The video data is captured video data of a real world scene and may typically be three dimensional video data generated from capture of the scene by multiple cameras offset with respect to each other. The video data may for example be multiple video streams from the different cameras or may e.g. be video data for one or more capture positions together with depth information. It will be appreciated that many different approaches for capturing video data of a real world scene, for generating (three dimensional) video data representing the capture, and for communicating/distributing video data are known, and that any suitable approach may be used without detracting from the invention.

In many embodiments, the 3D video data may comprise multi view images and thus may comprise a plurality of (simultaneous) images of the scene from different viewpoints. In many embodiments, the 3D video data may be in the form of an image and depth map representation where images/frames are provided together with associated depth maps. The 3D image data may specifically be a multi-view plus depth representation comprising for each frame at least two images from different viewpoints with at least one of the images having an associated depth map. It will be appreciated that if the received data is e.g. a multi-view data representation with no explicit depth map, then a depth map can be generated using a suitable depth estimation algorithm, such as specifically a disparity estimation based approach using the different images of the multi-view representation.

In the specific example, the first receiver 601 may receive MVD (Multi View and Depth) video data describing the 3D scene using a sequence of a plurality of simultaneous images and depth map(s), which henceforth also will be referred to as source images and source depth maps. It will be appreciated that for a video stream, a temporal sequence of such 3D images may be provided.

The received video data is linked to a capture pose region which is typically a region of the scene that is proximal in the scene to the capture pose(s), and typically is a region including the capture poses. The capture pose region may be a range of intervals for one, more, or all parameters that represent the capture pose and/or viewing pose. For example, if the poses are represented by a two dimensional position, the capture pose region may be represented by ranges of the corresponding two positions. i.e. as a two-dimensional area. In other embodiments, the poses may be represented by six parameters, such as typically three positional parameters and three orientation parameters, and the capture pose region may be given by limits on the six parameters. i.e. a full 6 DoF representation of the pose and the capture pose region.

In some examples, the capture pose region may be a single capture pose corresponding to a single pose corresponding to a viewport (view position and orientation) for the provided captured video data. The capture pose region may be a set of poses indicating/comprising the pose or poses for which the scene has been captured.

In some embodiments, the capture pose region may be provided directly from the source of the video data and it may specifically be included in the received video data stream. It may specifically in some embodiments be provided as metadata of the video data stream. In the example of FIG. 2, the video data may be provided based on a row of cameras 205 which are positioned within a capture pose region 205 that may be communicated to the video rendering device 101.

The video rendering device may in some embodiments be arranged to use the capture pose region directly as received. In other embodiments the video rendering device may be arranged to modify the capture pose region or may itself generate a capture pose region.

For example, in some embodiments, the received data may only include video data corresponding to a given capture pose but with no indication of the capture pose itself, of any extended region, or of how suitable the image data is to view synthesis for other poses than the given capture pose. In such a case, the receiver 601 may for example proceed to generate a capture pose region based on the received capture pose. For example, it may consider that the provided video data is linked to a reference pose and thus for this reference pose the video data may be rendered directly without any view shifting or projection. All poses may then be measured relative to this reference pose and the capture pose region may be determined as the reference pose, or e.g. as a predetermined region centered on the reference pose. As the user moves, the viewing pose may then be represented/measured relative to this reference pose.

In some embodiments, the capture pose region may simply be considered to correspond to the single pose, such as e.g. that of the received video data. In other embodiments, the receiver 401 may proceed to generate an extended capture pose region, e.g. by performing an evaluation of quality degradation as a function of a difference or distance to the capture pose. For example, for various test poses deviating by different amounts from the capture pose, the first receiver 601 may evaluate how large a proportion of the corresponding viewport is covered by image data and how large a proportion corresponds to e.g. de-occluded areas/objects or for which no data is provided, e.g. due to the viewport extending over parts of the scene not covered by the capture cameras. The capture pose region may for example be determined as the 6-dimensional region in which the proportion of the corresponding viewport not covered by image data is less than a given threshold. It will be appreciated that many other approaches for evaluating a quality level or degradation as a function of the deviation between the capture pose and viewing poses are possible and that any suitable operation may be used.

As another example, the first receiver 601 may for example modify the capture pose region to be a region comprising all poses that have a distance of less than a given threshold to a nearest capture pose, for example to the nearest camera pose when a plurality of camera poses are provided, or to the nearest pose of a received capture pose region provided with the video image. The distance may be determined in accordance with any suitable distance measure including possibly a consideration of both positional distances and angular (orientation) distances.

It will be appreciated that in other embodiments other approaches for determining a capture pose region may be used and that the specific approach for determining a capture pose region reflecting a set of poses for which it is considered that images can be generated with suitable quality will depend on the requirements and preferences of the specific embodiment.

The video rendering apparatus of FIG. 6 further comprises a second receiver 603 which is arranged to receive a viewing pose for a viewer (and specifically in the three dimensional scene). The viewing pose represents a position and/or orientation from which the viewer views the scene, and it may specifically provide a pose for which views of the scene should be generated.

It will be appreciated that many different approaches for determining and providing a viewing pose is known and that any suitable approach may be used. For example, the second receiver 603 may be arranged to receive pose data from a VR headset worn by the user, from an eye tracker, etc. In some embodiments, a relative viewing pose may be determined (e.g. the changes from an initial pose may be determined) and this may be related to a reference pose, such as for example a camera pose or a center of the capture pose region.

The first and second receivers 601, 603 may be implemented in any suitable way and may receive data from any suitable source, including local memory, network connections, radio connections, data media etc.

The receivers may be implemented as one or more integrated circuits, such as an Application Specific Integrated Circuit (ASIC). In some embodiments, the receivers may be implemented as one or more programmed processing unit, such as for example as firmware or software running on a suitable processor(s), such as a central processing unit, digital signal processing unit, or microcontroller etc. It will be appreciated that in such embodiments, the processing unit may include on-board or external memory, clock driving circuitry, interface circuitry, user interface circuitry etc. Such circuitry may further be implemented as part of the processing unit, as integrated circuits, and/or as discrete electronic circuitry.

The first and second receivers 601, 603 are coupled to a view synthesis or projection circuit or renderer 605 which is arranged to generate view frames/images from the received three dimensional video data where the view images are generated to represent the view of the three dimensional scene from the viewing pose. Thus, the renderer 605 generates a video stream of view images/frames for the 3D scene from the received video data and the viewing pose. In the following, the operation of the renderer 605 will be described with reference to the generation of a single image. However, it will be appreciated that in many embodiments the image may be part of a sequence of images and specifically may be a frame of a video sequence. Indeed, the described approach may be applied to a plurality, and often all, frames/images of an output video sequence.

It will be appreciated that often a stereo video sequence may be generated comprising a video sequence for the right eye and a video sequence for the left eye. Thus, if the images are presented to the user, e.g. via an AR/VR headset, it will appear as if the 3D scene is seen from the viewing pose.

The renderer 605 is typically arranged to perform view shifting or projection of the received video images based on the depth information. This will typically include techniques such as shifting pixels (changing pixel positions to reflect an appropriate disparity corresponding to parallax changes), de-occlusion (typically based on infilling from other images), combining pixels from different images etc. as will be known to the skilled person.

It will be appreciated that many algorithms and approaches are known for synthesizing images and that any suitable approach may be used by the renderer 605.

The image synthesis apparatus may thus generate view images/video for the scene. Further, as the viewing pose may change dynamically, corresponding to the user moving around in the scene, the view of the scene may continuously be updated to reflect the changes in the viewing poses. For a static scene, the same source view images may be used to generate the output view images but for video applications, different source images may be used to generate different view images, e.g. a new set of source images and depth may be received for each output image. The processing may thus be frame based.

The renderer 605 is arranged to generate the view of the scene to be from a different angles for a sideways movement of the viewing pose. If the viewing pose changes such that it is in a different direction/orientation, the renderer 605 is arranged to generate the view of three dimensional scene objects to be from a different angle. Thus, as the viewing pose changes, the scene objects can be perceived to be static and with a fixed orientation in the scene. The viewer may effectively move and see the object from a different direction.

The view synthesis circuit 205 may be implemented in any suitable way including as one or more integrated circuits, such as an Application Specific Integrated Circuit (ASIC). In some embodiments, the receivers may be implemented as one or more programmed processing unit, such as for example as firmware or software running on a suitable processor(s), such as a central processing unit, digital signal processing unit, or microcontroller etc. It will be appreciated that in such embodiments, the processing unit may include on-board or external memory, clock driving circuitry, interface circuitry, user interface circuitry etc. Such circuitry may further be implemented as part of the processing unit, as integrated circuits, and/or as discrete electronic circuitry.

As previously mentioned, an issue with view synthesis is that the quality decreases as the viewing pose for which the view is synthesized increasingly differs from the capture poses of the provided scene video data. Indeed, if the viewing pose moves too far from the capture pose region, the generated image may be unacceptable with substantial artefacts and errors.

The video rendering device further comprises a store 615 for storing a three-dimensional mesh model of at least part of the real world scene.

The mesh model provides a three dimensional description of at least part of the scene. The mesh model may be comprised of a set of vertices interconnected by edges generating faces. The mesh model may provide a large number of e.g. triangle or rectangular faces providing a three dimensional representation of elements of the scene. Typically, the mesh is e.g. described by the three dimensional positions of the vertices.

In many embodiments, the mesh model may further include texture data and texture information for the mesh may be provided indicating a texture for faces of the mesh. In many embodiments, the three dimensional mesh model may comprise at least one pixel map having pixel values linked to vertices of a three dimensional mesh of the three dimensional mesh model.

Mesh models of a real world scene may provide an accurate yet practical representation of three dimensional information of the scene which in the video rendering device is used to provide improved image data for viewing poses differing by a large degree From the capture pose region.

The mesh model may in many embodiments provide a static representation of the scene, and in many embodiments the video signal may provide a dynamic (typically real time) representation of the scene.

For example, the scene may be a football pitch or stadium and the model may be generated to represent the permanent part of the scene, such as the pitch, goals, lines, stands etc. The provided video data may be a capture of a specific game and will include dynamic elements such as players, coaches, spectators etc.

The renderer 605 comprises a first circuit 607 which is arranged to determine image data for at least part of the output image by projection of the received captured video data to the viewing pose. The first circuit 607 is thus arranged to generate image data for the viewport of the current viewing pose from the received video data. The first circuit 607 may apply any suitable view-shifting and reprojection processing to generate image data for the viewport of the viewing pose and may specifically generate a full or partial intermediate image corresponding to the current viewport (being the viewport for the current viewing pose). The projection/view shifting may be from the capture pose(s) of the video data, such as specifically may be a projection from the capture pose of one or more capture cameras to the current viewing pose. As previously mentioned, any suitable approach may be used including techniques for parallax shifting, de-occlusion etc.

The renderer 605 further comprises a second circuit 609 which is arranged to determine second image data for the output viewport for at least a first region in response to the three-dimensional mesh model. The second circuit 609 is thus arranged to generate image data for the viewport of the current viewing pose from the stored mesh model, including typically considering texture information. The second circuit 609 may apply any suitable approach for generating image data for a given view pose from a mesh model including employing techniques for mapping vertices to image positions in the output image dependent on the viewer pose, filling in areas based on vertex positions and texture, etc. The second circuit 609 may specifically generate a second intermediate image corresponding to the viewport for the current viewing pose. The second intermediate image may be a partial image and may comprise image data for only one or more regions of the viewport.

It will be appreciated that many different approaches, algorithms, and techniques are known from synthesizing image data from three dimensional data including from captured video data and from a three-dimensional mesh model, and that any suitable approach and algorithm may be used without detracting from the invention.

Examples of appropriate view synthesis algorithms may for example be found in:
"A review on image-based rendering"
Yuan HANG, Guo-Ping ANG Virtual Reality & Intelligent Hardware, Volume 1, Issue 1, February 2019, Pages 39-54 https://doi.org/10.3724/SP.J.2096-5796.2018.0004 or

"A Review of Image-Based Rendering Techniques" Shum: Kang

Proceedings of SPIE—The International Society for Optical Engineering 4067:2-13, May 2000 DOI: 10.1117/12.386541 or e.g. in the Wikipedia article on 3D rendering: https://en.wikipedia.org/wiki/3D_rendering The renderer 605 may thus generate image data for the current viewpoint in two separate ways, namely one based on the received video data and one based on the stored mesh model.

The renderer 605 further comprises a third circuit 611 which is arranged to generate the output image to include both the first image data and the second image data. Specifically, for at least a first region, the output image is generated to include the second image data generated from the mesh model and for at least part of the output image outside the first region, the output image is generated to include the first image data generated from the video signal.

In many scenarios, the output image is generated to include the first image data for all areas where the resulting image quality is considered to be sufficiently high, and the second image data is included for the areas for which the image quality is not considered sufficiently high.

The renderer 605 comprises a fourth circuit 613 which is arranged to determine one or more regions of the output images for which the second image data should be used, i.e. for which the image data generated from the mesh model rather than from the video data should be included in the output image. The fourth circuit 613 is arranged to determine a first such region in response to the deviation of the viewing pose relative to the capture pose region. Thus, the renderer 605 may be arranged to determine a region of the output image in which video based image data is replaced by model based image data where the region is dependent on the viewing pose and on how that differs from the capture pose region.

In some embodiments, the fourth circuit 613 may be arranged to determine the first region dependent on the difference between the viewing pose and the capture pose region. For example, if the distance between these (in accordance with a suitable distance measure) is less than a given threshold, no region is defined, i.e. the entire output image is generated from the received video data. However, if the distance is larger than the threshold, the fourth circuit 613 may determine a region which is considered likely to be of insufficient quality and may control the second circuit 609 to use the second image data for this region. The region may for example be determined based on a direction of the change (typically in 6 DoF space).

For example, the video rendering device may be arranged to model the scene using a graphics package and with the graphics model being rendered to the viewport after a capture derived synthesis image such that the data of this is replaced by model generated in one or more regions when the viewing pose differs too much from the capture pose region.

Figure 7:
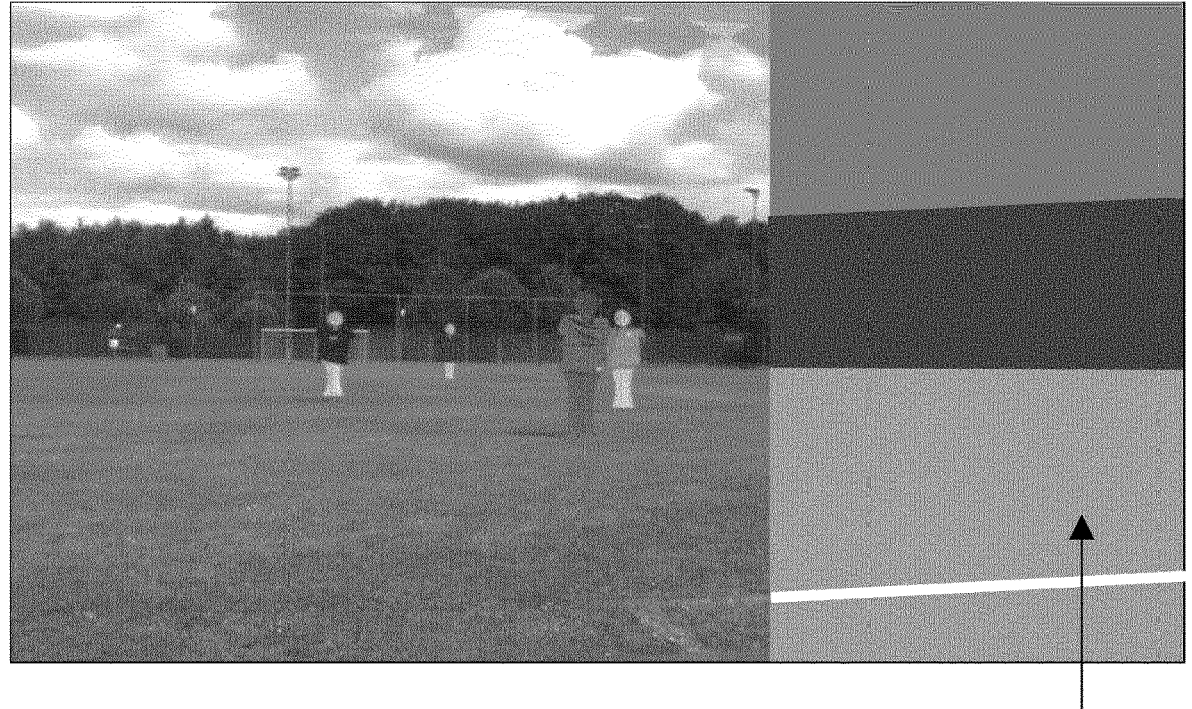
FIG. 7 illustrates an example of a view that may be generated for a specific viewing pose.
Figure 8:
FIG. 8 illustrates an example of a view that may be generated for a specific viewing pose.

As a specific example, the fourth circuit 613 may be arranged to consider a horizontal angular direction of the viewing pose (e.g. reflecting a viewer turning his/her head). As long as the viewing pose reflects a horizontal angular rotation which is below a given threshold angle, the output image corresponding to the viewport of the viewing pose is generated exclusively based on the video data. However, if the viewing pose indicates an angular rotation above this threshold, the fourth circuit 613 may determine that a region on the left or right side of the images exists which instead will be populated by the second image data. Whether the region is on the left or right side of the output image will depend on the direction of rotation indicated by the viewing pose (i.e. whether the viewer rotates their head left or right) and the size of the region may be dependent on how large the angular rotation is. FIGS. 7 and 8 show examples of how this approach may improve the images of FIGS. 4 and 5.

In the case that the viewing pose moves too far from the capture pose region, the image quality of synthesized views will degrade. In this case, the user experience may typically be substantially improved by instead of low quality or e.g. blurred data providing data generated be evaluating a static graphics model of the scene. This may in particular provide the viewer with improved spatial context of where he/she is in the scene.

It should be noted that in typical practical systems, it is desirable to be able to use capture cameras that have a limited field of view as it may e.g. allow that for a given sensor resolution more distant objects are captured at a higher resolution. Obtaining the same resolution using e.g. a 180-degree wide angle lens would require a sensor with a very high resolution which is not always practical, which is more costly in terms of camera and processing hardware, and which is more resource demanding for processing and communication.

As previously mentioned, in some embodiments, the video rendering device may determine the region in which model based image data is used, and specifically whether such a region should be included, based on the distance between the viewing pose and the capture pose region. In some embodiments, the determination of the region based on the deviation of the viewing pose to the capture pose region may be based on a consideration of the impact of the deviation on the quality of the image data that can be synthesized for the viewing pose using the video data.

In some embodiments, the first circuit 607 may generate an intermediate image based on a projection of the received video data from the appropriate capture pose(s) to the viewing pose.

The fourth circuit 613 may then proceed to evaluate the resulting intermediate image and may specifically determine quality measures for different parts/areas/regions of the image. The quality measure may for example be determined based on the algorithm or process that is used to generate the image data. For example, image data that can be generated by a parallax shift may be assigned a high quality value, which may further be graduated depending on how large the shift is (e.g. for remote background the parallax shift may be zero and thus may not be sensitive to errors and noise in e.g. the parallax estimation). Image data that is generated by extrapolation of other image data into a de-occluded area may be allocated a lower quality value, which may further be graduated depending on how far an extrapolation of data is needed, the degree of texture variation in neighboring areas etc.

The fourth circuit 613 may then evaluate the determined quality measures to determine one or more regions in which the quality does not meet a quality criterion. A simple criterion may simply be to determine the regions as areas for which the quality measure is below a threshold. A more complex criterion may for example include requirements for a minimum size or shape of the region.

The second circuit 609 may then proceed to generate the output image as a combination of the video based (synthesized) image data from the intermediate image and the model based image data. For example, the output image may be generated by overwriting image data of the intermediate video based image by model based image data in the regions determined by the fourth circuit 613 to not have sufficient image quality.

In general, it will be appreciated that different approaches for assessing quality may be used.

For example, depth quality for different reasons may be determined and the region(s) in which to use model data may be determined based on the depth quality, such as specifically image regions that are generated using depth data which is considered to have a quality below a threshold.

To determine depth data quality explicitly. (at the encoder side or decoder side) a reprojection error can be calculated. This means that a view from the image data, which specifically may be a multi view set of data, is reprojected (using depth) to another known view, typically from the multi view set. Then a color difference measure (per pixel or averaged over a region) can be used as an indication of the quality. Occlusion/de-occlusion may influence this error calculation undesirably. This may be avoided by only accumulating errors in the metric when the absolute difference between a pixel's depth and the warped depth is less than a threshold. Such a process may e.g. be used to identify depth data that is considered to not be sufficiently reliable. When generating new images for a desired arbitrary viewpoint, regions that are generated to result from the use of such unreliable depth data may be identified and overwritten by image data generated from the model.

In some cases, a small total warp error may not be a sufficient indication of the rendering quality for an arbitrary new viewpoint. For example, when an arbitrary new viewpoint is near the original capture viewpoints, such as near the center of the viewing zone, the quality of the rendering will typically still result in a relatively high quality even if the depth quality of the depth data used is relatively low. Thus, regions may be determined by considering depth quality and identifying regions that result from bad quality depth data, but may further be subject to other parameters, such as how large a shift is performed (and specifically to the distance between the viewpoint for which the image is generated and the capture pose region defined for the image data.

Another way to determine the rendering quality to an arbitrary viewpoint is to compare image feature statistics of the synthesized image for the viewpoint with image feature statistics of one or more reference images. A relevant statistic may for example be the curvature. Curvature can be calculated directly for one of the color channels or on a summation using a local filter window. As an alternative, edge/contour detection can be used first, after which curvature statistics can be calculated. The statistics can be calculated over a given region in the synthesized view. This region can then be warped to one or more reference views and compared with the statistics found in a region there. Since a (larger) region is used, the evaluation becomes less dependent on the exact pixel correspondence. As an alternative to a physical meaningful feature such as curvature, a deep neural net may be used to calculate view-invariant quality features based on the multiple reference views. Such approaches may be applied and evaluated in regions thereby allowing regions of low quality to be determined.

In some cases, a so called 'no reference' metric may be used to assess the quality of the synthesized views without using any reference. A neural network is typically trained that predicts image quality.

Such quality measures may be determined without explicitly determining a deviation or difference between the viewing pose relative to the capture pose region (i.e. such a determination may be indirect in the quality measurements reflecting that the viewing pose deviates from the capture pose region).

As previously described the video rendering device may store a mesh model of the scene and typically it also stores a pixel map with pixel values linked to vertices of the three dimensional mesh of the three dimensional mesh model. The pixel map may specifically be a map that indicates visual properties (intensity, color, texture) with the mapping linking the mesh to the part of the pixel map reflecting the local visual properties. The pixel map may specifically be a texture map and the model of the scene may be a mesh plus texture model and representation.

In some embodiments, the server 103 may be arranged to transmit model information to the video rendering device and thus the first receiver 601 may be arranged to receive model data from the server 103. In some embodiments, the model data may be combined with the video data into a single data stream and the first receiver 601 may be arranged to store the data locally when received. In some embodiments, the model data may be received independently from the video data, and e.g. at a different time and/or from a different source.

In some embodiments, the video rendering device may be arranged to generate the model locally and may specifically be arranged to generate the model from the received video data. The video rendering device may specifically comprise a model generator 617 arranged to generate the three dimensional mesh model in response to the captured video data.

The model generator 617 may for example comprise some predetermined information, such as e.g. an expectation of the scene being a room with e.g. some predetermined objects in it (say goals) and may be arranged to generate a model by combining and adapting these parameters. For example, textures and dimensions of the room may be determined based on the received video data and the position of predetermined objects in the room may be determined based on the video data.

In some embodiments, a (simple) graphics model may be inferred from received multi-view videos. For instance, planar surfaces like floor, ceiling, walls can be detected and converted to graphics. Accompanying textures can optionally be extracted from the video data. Such inferences need not be derived on a frame-by-frame basis but can be accumulated and improved over time. When presented/rendered to the viewer, such relatively simple visual elements may be less interesting because of the missing details, but in comparison to no, or distorted, images, they may provide a better experience. They may often keep the viewer immersed and able to navigate (VR) without feeling disoriented.

In some embodiments the model generator may be arranged to employ object detection techniques to recognize objects or persons present in the scene. Such objects can then be represented by existing graphical models or avatars. The objects or body poses can optionally be determined and applied to the graphical representations.

It will be appreciated that various techniques and approaches for detecting objects and properties of a scene are known and that any suitable approach may be used without subtracting from the invention.

In some embodiments, the mesh model may be provided from a remote source, which specifically may be the server 103. In such a case, the server 103 may for example employ some of the above described approaches.

In some embodiments, the mesh model may be pre-generated and may as mentioned represent a static part of the scene. For example, in advance of the capture of an event (e.g. a football match), a dedicated capture of the static parts of the second common network element 707 may be performed. For example, a camera may be moved around the scene to provide images for developing a more accurate mesh model. The development of the model may further be based on e.g. input from a dedicated 3D scanner and/or manual adaptation of the model. Such an approach may be more cumbersome but may provide a more accurate model. It may be particularly useful for events where the same model can be reused for many users and/or events. For example, a lot of effort may be put into developing an accurate model of a football stadium, but this can be reused for millions of viewers and for many games/events.

In some embodiments, the renderer 605 may be arranged to adapt the video data based processing and/or data in dependency on the model processing and/or data. Alternatively or additionally, the renderer 605 may be arranged to adapt the model processing and/or data in dependency on the video data based processing and/or data.

For example, the mesh model may define the components of a goal such as the goal posts and crossbar. The video data may include data for part of the goal visible from the current viewing pose and this may be supplemented by the mesh model which may provide data for the rest of the goal. However, the generated image data may be adapted such that the different data matches more closely. For example, part of a cross bar may be generated from video data and part of the cross bar may be generated from the mesh model. In such an example, data may be adapted to provide a better interface between these sections. For example, data may be adapted such that the crossbar forms a linear object in the generated output image. This may for example be done by shifting image data for the crossbar generated from one source such that it lines up with and has the same direction as the image data for the crossbar from the other source. The renderer 605 may be arranged to adapt the model based image data to line up with the received video based image data, may be arranged to adapt the received video based image data to line up with the model based image data, or may adapt both so they line up with each other.

In some embodiments, the adaptation may be directly based on the generated image data but in other embodiments the adaptation may be based directly on the mesh model data using a suitable approach. Similarly, in some embodiments, the video rendering device may be arranged to adapt the mesh model in dependency of the generated video based image data. For example, rather than adapt the model based image data to line up with video based image data, the video rendering device may modify the model. e.g. by moving some vertices, until this results in generation of model based image data that does line up with the video based image data.

Specifically, in some embodiments, the renderer 605 may be arranged to adapt the generated model based image data in response to the captured video data. For example, colors from the model based image may deviate from the actual captured colors. This could be due to (dynamic) circumstances like lighting or shading conditions or the limitation of the models accuracy. The renderer 605 may accordingly modify the color to (more closely) match the colors of the captured data.

As an example of adapting the model based image, the color distributions may be sampled over the full image-area for both intermediate images. i.e. both for the video based and model based intermediate images. Subsequently, a single color offset may be applied on the model based image that minimizes the difference in the color distributions. An improvement is to apply multiple color offsets linked to components or clusters in the color-distribution. Another improvement is to operate both sampling the distribution and applying the offset to specific spatial visual elements (e.g. surfaces).

In some embodiments, the renderer 605 may be arranged to adapt the generated video based image data in response to the three-dimensional mesh model.

For example, the colors of the generated video based image may be modified to more closely match those recorded by the mesh model or the video based image may be rotated for lines to more closely match those resulting from the mesh model.

In some embodiments, the renderer 605 may be arranged to adapt the generated video based image data in response to the generated model based image data.

For example, the direction of linear image structures in the model based image data can be used to correct distortions of the same type of structure in the video based image data. Specifically, this can be done using a filtering operation that uses the knowledge of orientation and position of lines as detected in model based image.

In some embodiments, the renderer 605 may be arranged to adapt the generated model based image data in response to the generated video based image data.

For example, the previously provided example of adapting the color of the model based image may also be used to directly modify the stored colors (e.g. texture maps) for the model thereby allowing the corrections to be applied for future images/frames.

In some embodiments, the renderer 605 may be arranged to adapt the three dimensional mesh model in response to the generated video based image data.

For example, the position of light sources that are used to light the model can be modified to match the light conditions in the stadium (but possibly not using knowledge of the light source positions since that may not be available). As another example, positions of vertices may be adapted to result in a generated model based intermediate image that matches the video based image data. For example, different model based images may be generated for slightly varied positions of vertices close to the transition and the image resulting in the closest match to the video based image may be selected (e.g. resulting in the closest alignment of lines across the edge). The vertex positions in the mesh model may then be modified to the positions for the selected image.

In some embodiments, the second circuit 609 is arranged to vary a detail level for the first region in response to the deviation of the viewing pose to the capture zone. In particular, the detail level may be reduced for an increasing difference between the viewing pose and the capture pose region. The detail level may for example be reflected by the number of objects or features of the model are included in the generated image data.

In some embodiments, the intermediate images may gradually be blended into each other.

Figure 9:
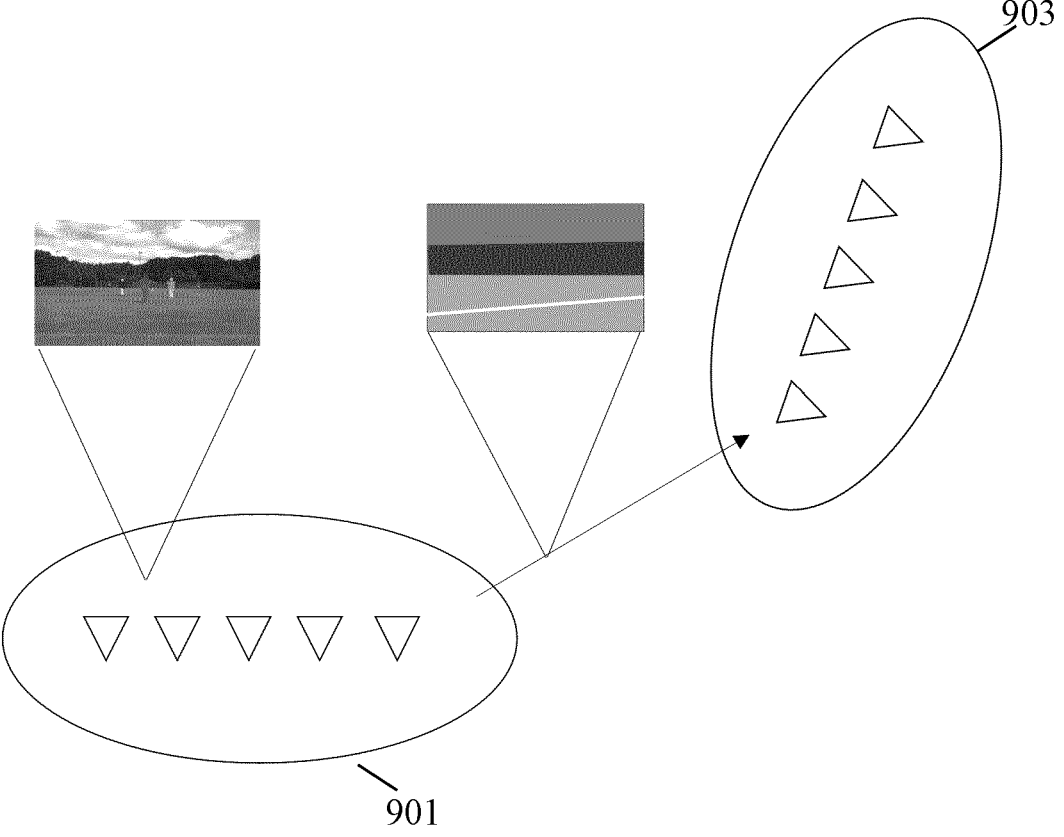
FIG. 9 illustrates an example of a capture of a 3D scene using two sets of capture cameras.

In some embodiments, the first receiver 601 may be arranged to receive further captured video data of the scene for a second capture pose region. For example, as illustrated in FIG. 9, the scene may be captured by two different camera rigs 901, 903 at different positions.

In such embodiments, the video rendering device may apply a similar approach to both capture pose regions and specifically the first circuit 607 may be arranged to determine third image data for the output image of the viewport of the current viewing pose based on the video data for the second capture pose. The output image may then be generated considering both the first image data and the second image data. For example, the image data may be selected between that derived from the first capture pose and that derived from the second capture pose based on which allows the best synthesis to be performed.

In some embodiments, the second circuit 609 may simply select between one of the sources on an image by image basis (or for group of images). However, in other embodiments, the selection may be performed individually for different regions or even for each individual pixel.

For example, the output image may be generated from video data from the closest capture pose region except for where this results in de-occlusion. For these areas, image data may instead be generated from the video data from the furthest capture pose region if this does not result in de-occlusion for the pixels of the area.

In such approaches, the fourth circuit 613 may further be arranged to generate the first region of the output image, i.e. the region of the output image being populated based on the mesh model, depending on a consideration of the viewing pose relative to both the first and second capture pose regions.

As a low complexity example, mesh model based data may be used for all areas for which the current viewing pose are de-occluded with respect to both capture pose regions.

In some embodiments, capture of a scene may be from two or more distinct regions and video data may be provided that is linked to two different capture pose regions. For a given viewing pose, the video rendering device may consider the deviation or difference to the multiple different capture pose regions in order to determine areas of the image which may or should be generated based on mesh model data.

There May be Provided:

An apparatus comprising:

a first receiver (601) arranged to receive captured video data for a real world scene, the video data being linked with a capture pose region;

a store (615) arranged to store a three-dimensional mesh model of at least part of the real world scene;

a second receiver (603) arranged to receive a viewing pose;

a renderer (605) arranged to generate an output image for a viewport for the viewing pose:

wherein the renderer (605) comprises:

a first circuit (607) arranged to generate first image data for the viewport for at least part of the output image by projection of captured video data to the viewing pose;

a second circuit (609) arranged to determine second image data for the output viewport for at least a first region of the output image in response to the three-dimensional mesh model;

a third circuit (611) arranged to generate the output image to include at least some of the first image data and to include the second image data for the first region.

Such an apparatus may include:

a fourth circuit (613) arranged to determine the first region in response to an image quality measure for first image data for the first region;

a fourth circuit (613) arranged to determine an intermediate image comprising the first image data; and to determine the first region as a region for which a quality of image data of the intermediate image does not meet a quality criterion; and/or a fourth circuit (613) arranged to determine the first region in response to quality measures for the first data.

Such an apparatus and/or fourth circuit may not determine a deviation and/or difference of the viewing pose relative to the capture pose region.

The approach may provide a particularly attractive user experience in many embodiments. As an example may be considered a football match captured by a camera rig at the center line and a second camera rig close to the goal. A viewer may take a viewing pose close to the center line and be presented with high quality image of the match. The user may then decide to virtually move to be close to the goal and when reaching this destination may be provided with a high quality video of the match based on the camera rig positioned close to the goal. However, in contrast to a conventional approach of teleporting between the positions, the user may be provided with an experience of a continuous change of position from the center line to the goal (e.g. emulating the user physically walking between the positions). However, as there may be insufficient video data to accurately render the views from positions between the centerline and the goal, the video data may for at least some part of the image be rendered from model data. This may in many scenarios provide an improved and more immersive experience than a conventional experience of the user simply teleporting from one position to the other.

The described approach may thus generate an image for a view pose/viewport. The image may be generated from two fundamentally different types of data and is specifically adaptively generated to include regions that are generated from the different types of data, namely one region is generated from captured video data of a real world scene and another region is generated from 3D mesh model data for the real world scene.

The approach may specifically in many scenarios address the issue that captures of a real world scene is in many cases incomplete. The approach may allow an improved output image/view of the scene to be generated and/or allow reduced video capture of a real world scene.

In contrast to conventional approaches where images for scene regions for which no captured video data is available are generated by extrapolation of the available data, the described approach may use two fundamentally different representations of the scene and combine these in the generation of a single image. The first type is captured video data and the second type is three-dimensional mesh model. Thus, both captured video data and 3D mesh model data may be used. In particular, mesh model data may be used to supplement the captured video data such that parts of the generated image for which the captured video data does not provide any information can still be presented.

The approach may adaptively combine two fundamentally different types of scene representation to provide an improved image quality, and in particular it may allow image data to be generated for views of a scene for which the captured video data has no information at all.

As an example, the described approach may for example allow an image to be generated for a given viewpoint that includes a part of the scene for which there is no captured video data at all, and in that case may even include scene features and objects for which there is no captured data whatsoever.

The described approach may provide many advantageous effects.

In particular, an image can be generated providing an improved view of real world scene features for more view poses and for a given capture scenario can be achieved. For example, parts of the scene can be displayed that otherwise would not be possible for a given view pose, including presentation of objects for which the captured video contains no data whatsoever. The approach may indeed facilitate capture including allowing fewer cameras to be used for the capture while still allowing a large part (potentially all) of the scene to be viewed in some form.

The approach may also e.g. reduce the data rate required for communication of video data for a scene. The capture may be reduced to a smaller part of the scene as it may be considered acceptable to replace parts of the scene by model data (e.g. the playing area of a football pitch may be captured in real time by video cameras whereas the upper parts of the stadium may be represented by static 3D mesh model data). As video data is typically dynamic and real time, it will in practice tend to require a much, much higher data rate. The data rate required to represent e.g. the upper parts of a stadium by 3D mesh data will in practice be much lower than if it needs to be captured by video cameras and represented by video data.

The approach may allow a substantially improved user experience including typically increased freedom. A technical effect is that the restrictions on movement caused by incomplete capture of video data may be reduced (compare e.g. to DI).

The approach may also in many cases facilitate implementation and/or reduce complexity and/or reduce computational burden. For example, reduced encoding/decoding of video capture can be achieved, facilitated rendering may be achieved (rendering based on a 3D mesh model is typically less complex and computationally intensive than rendering of captured video).

The invention can be implemented in any suitable form including hardware, software, firmware, or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

In the application any reference to one of the terms "in response to", "based on", "in dependence on", and "as a function of" should be considered to be a reference to the term "in response to/based on/in dependence on/as a function of". Any of the terms should be considered to be a disclosure of any of the other terms and the use of only a single term should be considered a short-hand notation that includes the other alternatives/terms.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

Generally, examples of an apparatus and method are indicated by below embodiments.

EMBODIMENTS

Claim 1. An apparatus comprising:
a first receiver (601) arranged to receive captured video data for a real world scene, the video data being linked with a capture pose region;
a store (615) arranged to store a three-dimensional mesh model of at least part of the real world scene;
a second receiver (603) arranged to receive a viewing pose;
a renderer (605) arranged to generate an output image for a viewport for the viewing pose:
wherein the renderer (605) comprises:
a first circuit (607) arranged to generate first image data for the viewport for at least part of the output image by projection of captured video data to the viewing pose;
a second circuit (609) arranged to determine second image data for the output viewport for at least a first region of the output image in response to the three-dimensional mesh model;
a third circuit (611) arranged to generate the output image to include at least some of the first image data and to include the second image data for the first region; and
a fourth circuit (613) arranged to determine the first region in response to a deviation of the viewing pose relative to the capture pose region.

Claim 2. The apparatus of claim 1 wherein the renderer (605) is arranged to:
determine an intermediate image comprising the first image data;
determine the first region as a region for which a quality of image data of the intermediate image does not meet a quality criterion.

Claim 3. The apparatus of claim 1 or 2 wherein the third circuit (609) is arranged to determine the first region in response to a difference between the viewing pose and the capture pose region.

Claim 4. The apparatus of claim 3 wherein the difference is an angular difference.

Claim 5. The apparatus of any previous claim wherein the renderer (605) is arranged to adapt the second image data in response to the captured video data.

Claim 6. The apparatus of any previous claim wherein the renderer (605) is arranged to adapt the first data in response to the three-dimensional mesh model.

Claim 7. The apparatus of any previous claim wherein the renderer (605) is arranged to adapt the second image data in response to the first image data.

Claim 8. The apparatus of any previous claim wherein the renderer (605) is arranged to adapt the first image data in response to the second image data.

Claim 9. The apparatus of any previous claim wherein the renderer (605) is arranged to adapt the three dimensional mesh model in response to the first image data.

Claim 10. The apparatus of any previous claim further comprising a model generator (617) for generating the three dimensional mesh model in response to the captured video data.

Claim 11. The apparatus of any previous claim wherein the first receiver (601) is arranged to receive the video data from a remote source (103); and to further receive the three dimensional mesh model from the remote source (103).

Claim 12. The apparatus of any previous claim wherein the second circuit (609) is arranged to vary a detail level for the first region in response to the deviation of the viewing pose relative to the capture zone.

Claim 13. The apparatus of any previous claim wherein the first receiver (601) is further arranged to receive second captured video data for the real world scene, the second captured video data being linked with a second capture pose region:

and wherein the first circuit (607) is further arranged to determine third image data for at least part of the output image by projection of the second captured video data to the viewing pose;

and the third circuit is arranged to determine the first region in response to a deviation of the viewing pose with respect to the second capture pose region.

Claim 14. A method comprising:

receiving captured video data for a real world scene, the video data being linked with a capture pose region;

storing a three-dimensional mesh model of at least part of the real world scene;

receiving a viewing pose;

generating an output image for a viewport for the viewing pose:

wherein generating the output image comprises:

generating first image data for the viewport for at least part of the output image by projection of captured video data to the viewing pose;

determining second image data for the output viewport for at least a first region of the output image in response to the three-dimensional mesh model;

generating the output image to include at least some of the first image data and to include the second image data for the first region; and determining the first region in response to a deviation of the viewing pose relative to the capture pose region.

The invention claimed is:

1. An apparatus, comprising:

a first receiver circuit, wherein the first receiver circuit is arranged to receive captured video data, wherein the captured video data provides a dynamic representation of a real world scene, wherein the video data is linked with a capture pose region;

a storage circuit, wherein the storage circuit is arranged to store a three-dimensional mesh model, wherein the three-dimensional mesh provides a static representation of a portion of the real world scene;

a second receiver circuit, wherein the second receiver circuit is arranged to receive a viewing pose; and a renderer circuit, wherein the renderer circuit is arranged to generate an output image for a viewport of the viewing pose;

wherein the renderer circuit comprises a first portion, a second portion, a third portion and a fourth portion, wherein the first portion is arranged to generate first image data for a portion of the viewport of a portion of the output image by view-shifting the captured video data from a capture pose to the viewing pose, wherein the second portion is arranged to generate second image data for a portion of the first viewport for at least a first region of the output image using the three-dimensional mesh model, wherein the third portion is arranged to generate the output image so as to comprise at least a portion of the first image data, wherein the third portion is arranged to generate the output image so as to comprise the second image data of the first region, wherein the fourth portion is arranged to determine the first region based of a deviation of the viewing pose relative to the capture pose region.

2. The apparatus of claim 1, wherein the renderer circuit is arranged to determine whether a quality of first image data generated by the first portion does not meet a quality criterion.

3. The apparatus of claim 1, wherein the third portion is arranged to determine if the first region based on a difference between the viewing pose and the capture pose region.

4. The apparatus of claim 3, wherein the difference is an angular difference.

5. The apparatus of claim 1, wherein the renderer circuit is arranged to change the second image data based on the captured video data.

6. The apparatus of claim 1, wherein the renderer circuit is arranged to change adapt the first data based on the three-dimensional mesh model.

7. The apparatus of claim 1, wherein the renderer circuit is arranged to change the second image data based on-to the first image data.

8. The apparatus of claim 1, wherein the renderer circuit is arranged to change the first image data based on the second image data.

9. The apparatus of claim 1, wherein the renderer circuit is arranged to change the three dimensional mesh model based on the first image data.

10. The apparatus of claim 1, further comprising a model generator circuit, wherein the model generator circuit is arranged to generate the three dimensional mesh model based on the captured video data.

11. The apparatus of claim 1, wherein the first receiver circuit is arranged to receive the video data from a remote source, wherein the first receiver circuit is arranged to receive the three dimensional mesh model from the remote source.

12. The apparatus of claim 1, wherein the second portion is arranged to vary a detail level of the first region based on the deviation of the viewing pose relative to the capture zone.

13. The apparatus of claim 1, wherein the first receiver circuit is arranged to receive second captured video data of the real world scene, wherein the second captured video data is linked with a second capture pose region, wherein the first portion is arranged to determine third image data for a portion of the output image by projection of the second captured video data to the viewing pose, wherein the third portion is arranged to determine the first region based on a deviation of the viewing pose with respect to the second capture pose region.

14. A method, comprising:

receiving captured video data, wherein the captured video data provides a dynamic representation of a real world scene, wherein the video data is linked with a capture pose region;

storing a three-dimensional mesh model, wherein the three-dimensional mesh model provides a static representation of a portion of the real world scene;

receiving a viewing pose; and generating an output image for a viewport of the viewing pose; the generating comprising:

generating first image data of the viewport for a portion of the output image by view-shifting the captured video data from a capture pose to the viewing pose;

generating second image data of the viewport for at least a first region of the output image using the three-dimensional mesh model;

generating the output image so as to comprise at least a portion of the first image data and the second image data of the first region; and determining the first region based on a deviation of the viewing pose relative to the capture pose region.

15. A computer program stored on a non-transitory medium, wherein the computer program when executed on a processor performs the method of claim 14.

16. The method of claim 14, further comprising determining whether a quality of first image data does not meet a quality criterion.

17. The method of claim 14, further comprising determining if the first region based on a difference between the viewing pose and the capture pose region.

18. The method of claim 17, wherein the difference is an angular difference.

19. The method of claim 14, further comprising changing the second image data based on the captured video data.

20. The method of claim 14, further comprising changing the first data based on the three-dimensional mesh model.

* * * * *